(12) United States Patent
Samson et al.

(10) Patent No.: US 8,117,555 B2
(45) Date of Patent: Feb. 14, 2012

(54) COOPERATING WIDGETS

(75) Inventors: Frederic Samson, Palo Alto, CA (US); Joerg Beringer, Los Altos, CA (US); Eric R. B. Wood, Menlo Park, CA (US)

(73) Assignee: SAP AG, Walldorf (DE)

( * ) Notice: Subject to any disclaimer, the term of this patent is extended or adjusted under 35 U.S.C. 154(b) by 893 days.

(21) Appl. No.: 11/867,653

(22) Filed: Oct. 4, 2007

(65) Prior Publication Data

US 2008/0141153 A1    Jun. 12, 2008

Related U.S. Application Data

(60) Provisional application No. 60/873,869, filed on Dec. 7, 2006.

(51) Int. Cl.
*G06F 3/048* (2006.01)
(52) U.S. Cl. .......... 715/769; 715/762; 715/764
(58) Field of Classification Search .......... 715/762, 715/769, 764
See application file for complete search history.

(56) References Cited

U.S. PATENT DOCUMENTS

| | | | |
|---|---|---|---|
| 5,848,424 A | 12/1998 | Scheinkman et al. | |
| 6,002,402 A * | 12/1999 | Schacher | 715/810 |
| 6,441,834 B1 | 8/2002 | Agassi et al. | |
| 6,480,842 B1 | 11/2002 | Agassi et al. | |
| 6,502,094 B1 | 12/2002 | Gvily et al. | |
| 6,640,238 B1 | 10/2003 | Bowman-Amuah | |
| 6,775,674 B1 | 8/2004 | Agassi et al. | |
| 6,904,463 B1 | 6/2005 | Fadel | |
| 7,085,994 B2 | 8/2006 | Gvily | |
| 7,146,505 B1 | 12/2006 | Harada et al. | |
| 7,546,543 B2 | 6/2009 | Louch et al. | |
| 7,555,538 B2 | 6/2009 | Shenfield et al. | |
| 7,761,800 B2 | 7/2010 | Chaudhri et al. | |

(Continued)

FOREIGN PATENT DOCUMENTS

JP    2006-114038    4/2006

OTHER PUBLICATIONS

Editors: van Kesteren et al.: Widgets 1.0 W3C Working Draft Nov. 9, 2006, Retrieved from the World Wide Web on Jan. 30, 2007 http://www.w3.org/TR/2006/WD-widgets-20061109/.

(Continued)

*Primary Examiner* — William Bashore
*Assistant Examiner* — Gregory A Distefano
(74) *Attorney, Agent, or Firm* — Blakely, Sokoloff, Taylor & Zafman LLP

(57) ABSTRACT

Methods and apparatuses enable interaction with an end-user application to perform functional operations with selected elements of the end-user application or an operating environment of the end-user application. An application runtime receives an indication of a selection of an item of the end-user application, and a command to have the selected item interact with a target. The interaction of the item with the target initiates an action that is based on functionality associated with the selected item and a type of the target. The target type may be a widget, a folder, the desktop, etc. The interaction may result in creation of a standalone widget, execution of the functionality, creation of a relationship, etc. An item from the desktop may also be selected and caused to interact with the end-user application to provide additional functionality to the end-user application.

33 Claims, 5 Drawing Sheets

U.S. PATENT DOCUMENTS

| | | | |
|---|---|---|---|
| 7,793,342 B1 | 9/2010 | Ebrahimi et al. | |
| 7,844,835 B2 | 11/2010 | Ginter et al. | |
| 2002/0046170 A1 | 4/2002 | Gvily | |
| 2002/0065955 A1 | 5/2002 | Gvily | |
| 2002/0078201 A1 | 6/2002 | Gvily | |
| 2004/0056896 A1* | 3/2004 | Doblmayr et al. | 345/769 |
| 2004/0181469 A1 | 9/2004 | Saeki | |
| 2004/0250118 A1 | 12/2004 | Andreev et al. | |
| 2006/0031442 A1 | 2/2006 | Ashley et al. | |
| 2006/0070007 A1* | 3/2006 | Cummins et al. | 715/769 |
| 2006/0107231 A1 | 5/2006 | Matthews et al. | |
| 2007/0101297 A1* | 5/2007 | Forstall et al. | 715/841 |
| 2007/0288599 A1* | 12/2007 | Saul et al. | 709/218 |
| 2008/0005789 A1 | 1/2008 | Kigo et al. | |
| 2008/0009344 A1 | 1/2008 | Graham et al. | |
| 2008/0141341 A1 | 6/2008 | Vinogradov et al. | |
| 2008/0195483 A1 | 8/2008 | Moore | |
| 2009/0024944 A1 | 1/2009 | Louch et al. | |
| 2009/0031284 A1 | 1/2009 | Shenfield et al. | |
| 2009/0055843 A1* | 2/2009 | Engber et al. | 719/328 |
| 2009/0158180 A1* | 6/2009 | Magnani et al. | 715/764 |

OTHER PUBLICATIONS

Wikipedia, Widget Engine Retrieved from the World Wide Web on Jan. 30, 2007 http://en.wikipedia.org/wiki/Widget_engine.

Wikipedia, Widget (computing) Retrieved from the World Wide Web on Jan. 23, 2007 http://en.wikipedia.org/wiki/Widget_%28computing%29#Desktop_.

Wikipedia, Widget engine Retrieved from the World Wide Web on Jan. 23, 2007 http://en.wikipedia.org/wiki/Widget_engine.

Wikipedia, Google Desktop Retrieved from the World Wide Web on Jan. 23, 2007 http://en.wikipedia.org/wiki/Google_Desktop.

Wikipedia, Yahoo! Widget Engine Retrieved from the World Wide Web on Jan. 23, 2007 http://en.wikipedia.org/wiki/Konfabulator.

Non-Final Office Action for US Appl. No. 11/867,655 mailed Jul. 6, 2010, 14 pages.

Non-Final Office Action for U.S. Appl. No. 11/867,648, mailed Aug. 30, 2010, 21 pages.

Final Office Action for U.S. Appl. No. 11/867,655, mailed Sep. 13, 2010, 12 pages.

Final Office Action from U.S. Appl. No. 11/867,648 mailed Mar. 1, 2011, 21 pages.

Non-Final Office Action for U.S. Appl. No. 11/867,655, Mailed Mar. 15, 2011, 12 pages.

Non-Final Office Action for U.S. Appl. No. 11/867,650, Mailed Mar. 21, 2011, 26 pages.

* cited by examiner

COOPERATING WIDGETS

RELATED APPLICATION

This U.S. Patent Application claims the benefit of priority of U.S. Provisional Application 60/873,869 filed Dec. 7, 2006.

FIELD

Embodiments of the invention relate to end-user applications, and more particularly to interactions of end-user applications within an operating environment.

BACKGROUND

Computing systems enable a user to perform various operations supported by the computing system. Applications are developed to provide functionality and enable a user to perform one or more functions associated with the application. There is a focus in modern work environments with providing access to data and work functionality that a user needs to perform his or her job. Current end-user applications for performing work are generally full-featured applications, which have limitations on the interfaces provided to enable work to be performed. Traditional end-user applications are currently limited to functionality bounded by the environment provided by the application itself. Some applications allow the use of extensions to provide an additional function to an application, or tie in to another full-featured application. However, the use of extensions generally provides more features to an application that may already suffer from "feature-creep," and the application still has the same limitations on user interfacing.

Another class of applications exists in addition to the feature-rich or full-featured applications referenced above. Such applications are generally referred to as "widgets" or "gadgets," and they are designed to be narrowly defined in scope of functionality and have a dedicated purpose. Traditionally, widgets are considered to be more portable from one platform to another. The functionality of widgets is traditionally limited to games (e.g., tic-tac-toe, sudoku) or novelty features (e.g., cursor followers), and more recently to functional features available over an unsecured Internet connection (e.g., weather indicator, mortgage rate indicator, etc.). Traditionally, widgets suffer many defects that make them unsuitable for use in a work environment. Such defects may include security issues surrounding the use of portable applications, and the limited functionality limits their standalone usefulness in a work environment. There is a general lack in end-user applications, whether full-featured, or widgets, of interactive ability.

SUMMARY

Methods and apparatuses enable interaction with an end-user application to perform functional operations with a selected item of the end-user application or a selected item of an operating environment of the end-user application. The end-user application has an associated runtime that obtains information relating to a selection of an item, a selection of a target, and a relationship between the item and the target. When the runtime receives an indication of the selection of the item of the end-user application, and a command to have the selected item interact with a target, the runtime can initiate an operation that is based on functionality associated with the selected item and the target type. The end-user application may be a widget, which may include being an enterprise widget. The target type may be, for example, a widget, a folder, the desktop, etc. The interaction may result in, for example, creation of a standalone widget, execution of the functionality, creation of a relationship, etc.

In one embodiment, an item from the desktop may be selected and caused to interact with the end-user application to provide additional functionality in the end-user application. The functionality generated in the end-user application is dependent on the type of the item caused to interact with the end-user application.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
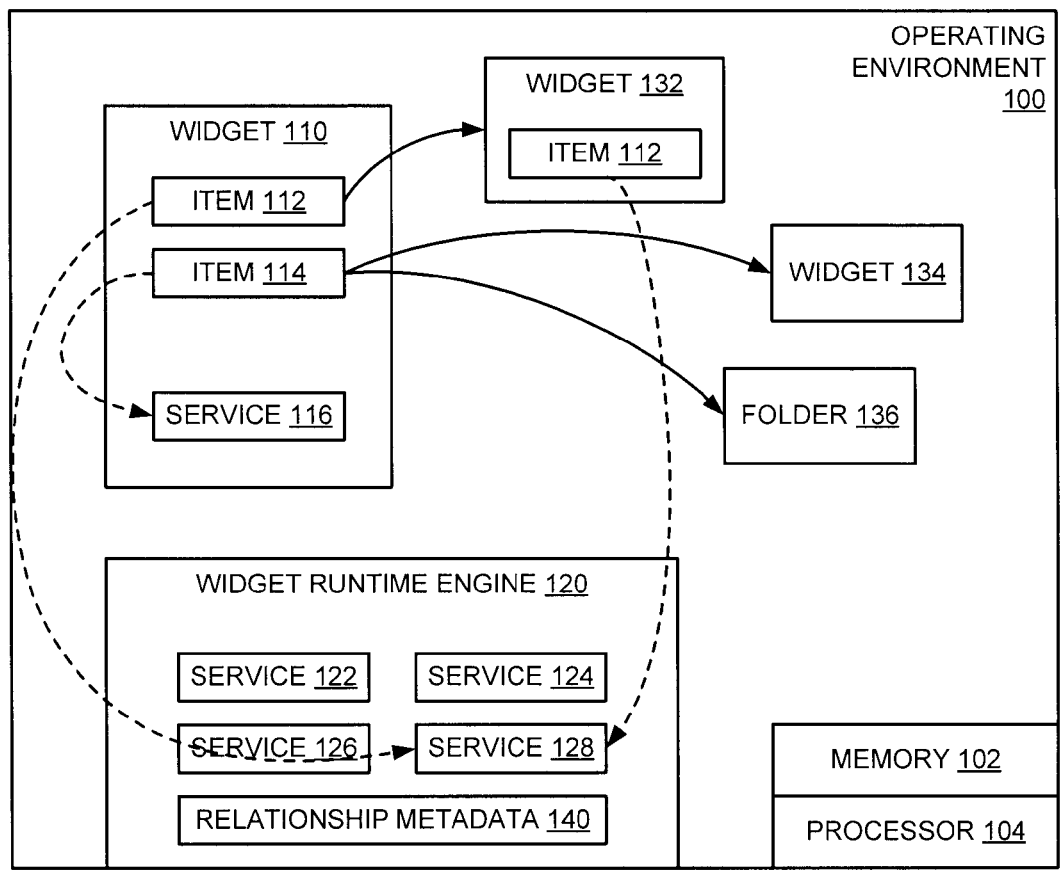
FIG. 1 is a block diagram of an embodiment of an operating environment where an item from a widget interacts with another element in the operating environment.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Functional interactions with end-user applications are provided. An item of an end-user application can be caused to interact with a target (e.g., a widget, a folder, the desktop, etc.). Based on the target type and a functionality associated with the selected item, one or more actions can be initiated (e.g., create a standalone widget, create a relationship, execute the functionality associated with the item, etc.). A runtime of the operating environment may include relationship data that indicates what operations to perform when a particular interaction is initiated, or may have a default interaction. An item could also be selected from somewhere on the operating environment (e.g., another end-user application, an object, a folder, etc.) and caused to interact with an end-user application. The results of the interaction can generally cause an additional functionality to be incorporated into the end-user application. As used herein, the interaction can be the result of a drag-and-drop operation, a copy and paste, a menu selection, etc.

Functional interactions as described herein can be applied to any type of end-user application, and may find particular use in cooperation among widgets. As used herein, a widget refers to a class of applications characterized by focused functionality and features, minimized form factor (relative to feature-rich applications), and reduced resource consumption (relative to feature-rich applications). In one embodiment, the widget is an enterprise widget or a business widget, which is a widget further characterized by the ability to connect to a backend enterprise system. Thus, in one embodiment, a widget represents a modularization of functional components of a service oriented architecture (SOA). That is, an SOA provides functionality in the form of enterprise services, which may be associated with business widgets that each provide a single service.

The functional interactions are enabled via a framework for collaboration or cooperation between end-user applications. User collaboration can be provided by combining functionality from different end-user applications or combining widgets. Widgets can also cooperate via associations or relationships that the widgets have with other widgets in the same operating environment. As examples of different possible methods for relationships, there may be methods to create a child widget (children widgets) through either spawn-off or tear-off of content, freeze a specific search as a dynamic query, create a functionality shortcut, tear off a selected item from an end-user application, which can initiate an operation on a desktop, and create a widget from a link, for example, by enabling a drag and drop of the link to the desktop to create a widget. An end-user application can also be "filled," where additional content is provided in the end-user application via, for example, dropping a link or a business object onto the end-user application. A widget can also be dropped into a container, such as a widget briefcase, as discussed in co-pending U.S. patent application Ser. No. 11/867,648, entitled, "WIDGET LAUNCHER AND BRIEFCASE," and filed concurrently herewith. Other containers or logical structures or object associations could also be used. In one embodiment, dropping an enterprise widget onto another object, of either the same or different type, creates an action. In one embodiment, dropping an enterprise widget onto a function causes an action, such as the creation of a new purchase order.

Although the principles of end-user application interaction as discussed herein are applicable to any type of end-user application, particular descriptions are made in reference to widgets and enterprise widgets. Thus, a short discussion of widgets follows by way of example, and not limitation. The functionality of a widget is provided via one or more runtime components within an operating environment in which the widget is instantiated. The principle functionality and/or features of the enterprise widget are provided via a backend service. In one embodiment, an enterprise widget can be understood as being an interactive desktop tool, where a user would generally associate the user interface with the functionality of the enterprise widget. An enterprise widget may also be referred to as an enterprise gadget, a business widget, or a portable logic module (PLM).

Widget as used herein should be distinguished from the use of the term "widget" to refer to GUI components such as sliders, buttons, checkboxes, and dropdowns. The World Wide Consortium ("W3C") define widgets as "usually small client-side applications for displaying and updating remote data, packaged in a way to allow a single download and installation on a client machine . . . ." Refer to W3C, Widgets 1.0 (W3C Working Draft 9, November 2006). The W3C definition identifies a class of applications referred to herein as widgets. An enterprise widget more specifically includes functionality that enables communication with backend servers within an enterprise environment. Enterprise widget is to be understood broadly to incorporate any diminutive application having backend access. In one embodiment, the enterprise widget contains all business logic necessary to interface with the user and send a request to the enterprise. Alternatively, business logic can be contained within a runtime environment on which the enterprise widget executes. Enterprise widgets permit users to more easily and rapidly access and view data from enterprise/backend systems and to commit data to enterprise/backend systems.

In one embodiment, an enterprise widget targets one backend system and one task type. For example, one widget can allow a user to look up a sales order or create a sales order, while another widget permits a user to quickly load files to a collaboration environment by simply dragging and dropping files onto a collaboration widget. The user does not need to interact with a user interface (UI) associated with the collaboration environment (e.g., SAPMats as available from SAP AG of Walldorf Germany). Instead of a user interacting with the UI, the widget can perform the interactions. The invocation of the UI interaction is provided by the interaction with the widget, which is able to interpret the interaction to the desired interface, and is enabled with necessary application programming interfaces (APIs) and/or code to provide the interaction. An enterprise widget can be a proxy for an object instance, can represent a collection of instances, can enable a specific action (e.g., send, look up, enter data, check status), can display a specific aspect of an object (e.g., KPI monitor, conversation tracker, progress tracker, status updater, item capturer), and/or can represent a container for widgets.

In one embodiment, the interaction functionality includes the ability to generate an "i-View" widget or an equivalent. SAP i-Views enable a user to relate or drop data within an operating environment of a portal. In one embodiment, a widget runtime enables dragging an item out of a portal and generating a standalone widget from the item obtained from the portal. For example, an i-View widget can result from a right-click on an i-View, which could instantiate a widget right on the desktop of that i-View.

In one embodiment, the interactions described herein work in conjunction with other user application solutions. For example, SAP provides a DYNAMIC WORK CENTER, as described in co-pending U.S. patent application Ser. No. 11/413,258, filed Apr. 28, 2006. The Dynamic Work Center provides a dynamic presentation and selection of functions/actions related to a user's context. Dynamic interfaces from a Dynamic Work Center can provide the ability to click an icon or other item to provide end-user application functionality. The Dynamic Work Center can be a source of an item that interacts with an end-user application as described herein.

Additionally, in one embodiment, interoperability of end-user applications can provide extensions of functionality with other existing applications. For example, MICROSOFT OUTLOOK available from MICROSOFT CORPORATION of Redmond, Wash., is a commonly-used workplace application. Note that all trademarks used herein are the property of their respective owners, and are used herein solely for purposes of identification. In one embodiment, an extension to Outlook can enable, for example, a right-click on a person's contact information to "add to my collaboration widget," or some other end-user application.

FIG. 1 is a block diagram of an embodiment of an operating environment where an item from a widget interacts with another element in the operating environment. Operating environment 100 represents any type of computing system operating environment, which may be understood to include both software and hardware features. Software features may include an operating system or a control interface, user interfaces (such as graphical user interfaces (GUIs)), etc. Hardware components may include the hardware resources such as memory, processor(s), storage, network interfaces, etc. Specific hardware elements illustrated are memory 102 and processor 104. Memory represents any type of operating memory, which is generally volatile and stores data and/or code to be executed by processor 104. Processor 104 represents one or more processing resources of operating environment 100, which may include central processing unit(s) (CPUs), microcontrollers, multi-core devices, etc. Processor 104 generally executes instructions that implement software components of operating environment 100, including widget 110 or similar applications.

In one embodiment, operating environment 100 includes widget 110. Note that widget 110 could be any type of application, as discussed above. However, reference to the general principles of component interactions can be understood by reference to a widget. The description with reference to a widget should be understood only as representative, and is not limiting on the type of application to which the principles could be applied.

Widget 110 may execute in conjunction with widget runtime engine 120. Widget runtime engine 120 represents one or more logical components that provide functional and control features for widget 110. Runtime engine 120 also provides such logical components for other widgets running on operating environment 100. Thus, all widgets designed for runtime engine 120 can be supported by runtime engine 120 on operating environment 100. A runtime engine can be understood generally as having control features, translation or interpretation blocks, etc. The runtime engine is generally the underlying rendering engine for the widgets of operating environment 100. Widget 110 may be standalone in reference to the logic or functionality it provides, or the functionality may be provided via runtime engine 120. In an implementation where widget 110 is replaced with some other application, runtime engine 120 may be logic or code included within the application itself.

Widget 110 includes item 112 and item 114. Items 112 and 114 have a functionality associated with them that widget 110 provides. For example, an item could be a picture or graphic representing a company or a person. An associated function may be to display contact information, or to launch a contact mechanism (e.g., open an email addressed to the contact, generate a chat session, etc.). Another example may be a block of text or data that is associated with a work group collaboration room that can be initiated by interfacing with the text. Another example may be an icon that represents the ability to generate a table, or a report, or a drawing, etc. The examples of what the items may represent are innumerable, and the skilled practitioner will understand that items can be associated with particular functionality. Each widget 110 or other application can be implementation-specific with regards to functionality and items associated with the functionality.

The association of items 112 and 114 to particular functionality is illustrated with reference to the dashed lines to, respectively, service 128 of runtime engine 120 and service 116 of widget 110. As mentioned above, widget 110 may include self-contained logic to provide functionality to widget 110, as with service 116. Other functionality may be provided via runtime engine 120, as with service 128. In one embodiment, widget 110 is a business widget that connects to a backend enterprise server for its functionality. Such functionality may be accessed via runtime engine 120.

Interactions with items 112 and 114 with other components of operating environment 100 can enable functionality previously unavailable. Illustrative examples are described below which is to be understood as a non-exhaustive discussion of possible implementations. Other interactions are possible with the technology described herein. As described herein, interactions can occur in any of a number of ways, including drag-and-drop, copy/cut-and-paste, menu selection, etc. For purposes of simplicity in description, the following examples are discussed in relation to drag-and-drop, although it will be understood that the drag-and-drop interactions are merely described as representative of any interaction (e.g., selection and command to cause an interaction).

In one embodiment, item 112 of widget 110 is dragged and dropped onto operating environment 110, or a desktop of operating environment 100. The desktop can be generally understood as a GUI provided by most operating systems that acts as a consistent starting point of operation on a computing device. In one embodiment, dropping item 112 onto the desktop generates new widget 132. Such an interaction may be described in reference to widget 110 as the "parent widget" and widget 132 as the "child widget." Note that although described as "parent" and "child," it is important to understand that child widget 132 exists independently of widget 110. That is, changes to widget 110 will not affect child widget 132, opening or closing widget 110 will not affect the state (open or closed) of child widget 132, etc. Child widget 132 has a life of its own independent of widget 110. The creation of child widget 132 generates a new widget having item 112, with the associated functionality (service 128). Thus, widget 132 can now provide the functionality of service 128. In an implementation where item 114 were spawned off of widget 110, the same logic could be created within widget 132 to have service 116 associated with item 114 in the new widget. In one embodiment, dragging item 112 out of widget 110 onto the desktop removes item 112, which then exists within widget 132, but not within widget 110. Such an interaction can be referred to as "tearing off" functionality. Tear-off functionality could result the creation of an object-centric widget or a function-centric widget, depending on what is torn off. Alternatively, the functionality can be duplicated, and would exist in both widgets 110 and 132.

In one embodiment, item 114 is dragged from widget 110 and dropped on widget 134 (the target). In one embodiment, item 114 may represent widget 110 itself, which could be dropped onto widget 134. Dropping widget 110 onto widget 134 provides a docking station for widgets. Such a docking station may be a widget briefcase or widget launcher, as described in co-pending U.S. patent application Ser. No. 11/867,648, referenced above. Such an interaction may be considered similar to creating a playlist. The target widget (widget 134 in FIG. 1) can be or become a container that logically associates all the contents of the container. Such functionality is useful for creating groups of widgets commonly used together to provide a "suite" of functionality for a given task. The functionality of the suite consists of associated portable logic blocks that can be added, removed, etc. Dropping item 114 onto widget 114 could also create other relationships between the widgets. For example, dropping item 114 onto widget 134 can create a functional relationship that causes widget 134 to be launched every time item 114 is executed from widget 110.

Runtime engine 120 includes relationship metadata 140. Relationship metadata 140 can be understood as any information, in any form, which provides a description of a relationship between a widget item and a function, an interaction result or action to perform when items of particular types are dropped on targets of particular types. The relationship metadata can be very specific, and indicate a particular action when a particular functionality is "dropped" onto a target of a particular type. Thus, causing the interaction may include causing runtime engine 120 or a similar component to determine what action to perform. The runtime engine could then initiate the action that is based on the target type and the functionality associated with the item.

In one embodiment, item 114 is dropped onto target 136. Note that although described in reference to item 114 having self-contained functionality, both the interaction with widget 134 and folder 136 could also be applied with item 112 having derived functionality. In one embodiment, folder 136 represents a collection, or a collaboration mechanism (e.g., a collaboration room icon, etc.). If the widget itself were dropped onto folder 136, in one embodiment, widget 110 would be added to a collection represented by folder 136. Alternatively, dropping widget 110 onto folder 136 may activate the widget for the collection. If item 114 is dropped onto folder 136, an object (e.g., a business object) may be added to folder 136, which could add the object to a collection, or as a resource to collaboration, or as a resource to a project, etc. In one embodiment, a scripting mechanism is defined across widgets to provide a default action, which could be initiated by dropping item 114 onto folder 136. In one embodiment, a widget may be cloned into the folder. Thus, a user could create multiple instances of the same widget.

In one embodiment, drag and drop interactions from widget 110 could include, for example, dropping a person object (which may be represented as item 112) onto widget 134, which may be a search widget. The search widget could be the ARGO enterprise search available from SAP. More details on Argo are available in co-pending U.S. patent application Ser. No. 11/333,961, filed Jan. 17, 2006. Thus, dropping a person item onto the search could result in performing an enterprise search on the person represented by the item.

In one embodiment, the interaction can be indicated by the rendering of the interaction. For example, dragging content or objects could create a ghosted image of the item being moved attached to a mouse pointer (e.g., dragging a results list from Argo could show a ghosted list of items to indicate what is being grabbed from Argo). In another example, hovering an item over a drop target could modify the ghosted drag image with an action modifier badge (e.g., the action modifier could be a plus badge when the action is adding the item to the target, or an envelope when the target has an email function). In another example, hovering over a drop target that has multiple drop actions can generate a spring-loaded ghosted menu of several action icons to allow a user to select the desired option without releasing the mouse button (e.g., dragging content on to a 'person' drop target could spring open a ghosted menu with options such as send via email (envelope), send via IM (chat bubble), send via SAPMats (SAPMats icon), etc.).

In one embodiment, widgets or other applications can be aware of the state of the computing device on which they are executing. For example, a widget can be aware that the computing device is online and connected to a backend, but is outside a firewall. Such device awareness can be linked, for example, to a location manager setting on a MACINTOSH computer available from APPLE COMPUTER, INC., of Cupertino, Calif., or a network connection profile on a WINDOWS machine (Windows is Available from Microsoft).

In one embodiment, the items selected from widget 110 to drag and drop to other components of operating environment 100 are objects. The object items can be dropped onto other objects, as described above (e.g., dropping a person object onto a project object, dropping a person object onto an "opportunity" object to assign a project or trigger a message or generate a document). In one embodiment, targets are functions, rather than other objects. For example, dropping a customer object onto an "order" function could initiate a new order being created for the customer. Such an interaction may also cause the customer's order history to be displayed. The function can be represented in another widget on the desktop.

The interaction mechanisms as described herein also provide a new collaboration model. For example, a search for a particular subject, a particular project, or a particular area of expertise within an enterprise may provide a result of a list of individuals. Each individual is identified by a business object. The results could be dragged off the search results (e.g., of a search widget) and dropped onto a collaboration target. The individuals could then all be sent an alert, sent a file, provided with a worklist or an action item, etc.

Figure 2:
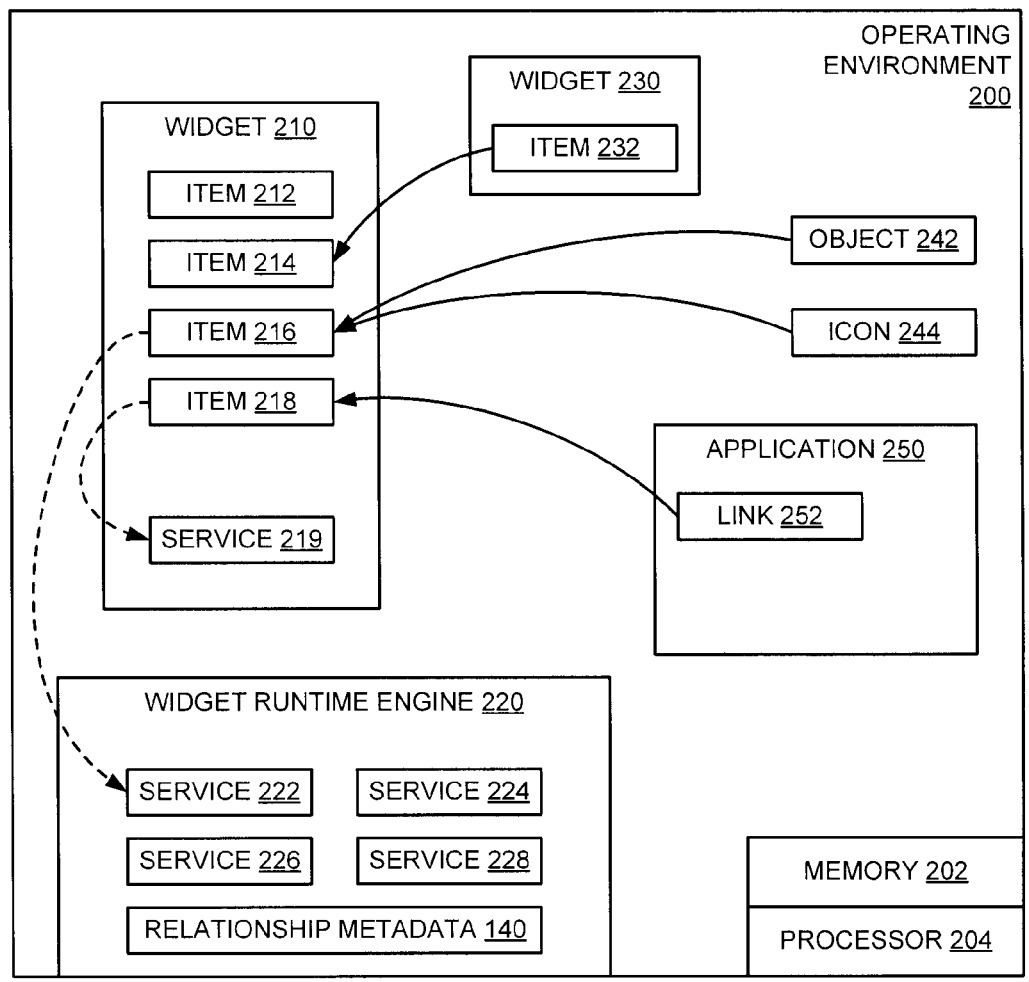
FIG. 2 is a block diagram of an embodiment of an operating environment where an item from the operating environment interacts with a widget in the operating environment.

FIG. 2 is a block diagram of an embodiment of an operating environment where an item from the operating environment interacts with a widget in the operating environment. Operating environment 200 provides an example of operating environment 100 of FIG. 1. Operating environment 200 includes widget 210, which can be a widget as described herein, or any other type of end-user application. As used herein, an end-user application is one that has user interface components and mechanisms, as contrasted to applications that are limited to execution by a system and have no interfacing with a user. Operating environment 200 includes memory 202 and processor 204, which can be understood as hardware resources on which operating environment 200 exists, and on which the applications and components of FIG. 2 execute.

Widget 210 includes various items, 212-218, which are described in more detail below. Item 212 can be considered to be an item associated with a functionality of widget 210 as the widget originally exists. For example, perhaps widget 210 is a standard widget available as part of a software package, and the default configuration of the widget provides for functionality associated with item 212 (the specific functionality is not shown). The functionality could be self-contained within widget 210, or could be derived from widget runtime engine 220.

Runtime engine 220 represents one or more logical components that provide functional and/or control features for widgets 210 and 230. In one embodiment, runtime engine 220 includes services 222-228, which represent service interfaces to a backend server or to functionality within operating environment 200 from which functionality of a widget may be derived. Thus, a widget can provide the backend service as its functionality. Runtime engine 220 includes relationship metadata 260. Relationship metadata 260 can be understood as any information, in any form, which provides a description of a relationship between a widget item and a function, an interaction result or action to perform when items of particular types are dropped on targets of particular types. Thus, runtime engine 220 is enabled to initiate various actions based on interactions between components of operating environment 200.

FIG. 2 represents a static representation of one or more possible implementations where one or more items are incorporated into widget 210 from the surrounding operating environment 200. Many of the interactions discussed below have already been suggested in the discussion with regards to FIG.

1, except that now the interactions will be looked at from the view of widget 210 being the target of an interaction, rather than its source.

The interactions may cause various actions within the operating environment. In one embodiment, it can be understood that certain interactions dynamically modify or change end-user applications within operating environment 200. The dynamic modification is a runtime event, rather than a development or a design-time operation. Thus, an executing end-user application, such as a widget, can have content added to it, or removed or copied from it to create new or modified end-user applications. The end-user applications thus can be considered to be dynamic in terms of the functionality provided, which may be changed in runtime. The flexibility provided by such an approach allows a very customizable work experience, where a user can dynamically establish the functionality necessary to perform the user's work.

In one embodiment, widget 210 can be dynamically modified through interactions with other items in operating environment 200. For example, widget 230 represents a widget or another application executing on operating environment 200. Widget 230 includes functional item 232. Item 232 is functional because there is an associated functionality provided in widget 230 via activation of item 232. For example, item 232 could be any of the items mentioned above, including an object, a graphic, a text field, as well as a "button" or other interface component with an associated functionality. In one embodiment, dragging and dropping item 232 onto widget 210 generates item 214, which represents the "same" item in widget 210 as in widget 230, with the same functionality now existing in widget 210. Importantly, the functionality exists in widget 210 independent of widget 230. Thus, widget 210 is capable of producing the functionality independently of the state of widget 230. In one embodiment, the functionality is removed from widget 230; whereas in an alternate embodiment, the functionality is duplicated.

Object 242 may also be dragged and dropped onto widget 210. Object 242 may be present in another application, or may be retrieved from a database or object repository. In one embodiment, dropping object 242 onto widget 210 generates item 216 with an associated functionality. For example, the functionality may be associated with service 222 of runtime engine 220. Item 216 may be object 242 as incorporated into widget 210. Thus, business objects can be incorporated into a widget or other application to provide functionality there. Note that incorporation of object 242 refers to generating an instance of the object within the widget. Multiple end-user applications can have instances of the same object.

Icon 244 represents a function that exists on a desktop. In one embodiment, dragging and dropping icon 244 initiates the function with respect to widget 210. In one embodiment, dropping the function onto widget 210 generates the function in widget 210. Item 216 may be a graphical representation similar to icon 244, and the functionality may be derived from operating environment 200, or from a backend. For example, item 216 may be associated with service 222 of runtime engine 220.

Application 250 represents an end-user application that is either a full-featured application or a widget that provides links to objects or services. Link 252 represents a link to an object or feature that exists external to application 250. In one embodiment, dragging and dropping the link creates item 218 associated with service 219, which provides a functionality for widget 210. Dragging and dropping link 252 may further include accessing an object or a service from a backend or a source in operating environment 200 and incorporating the functionality into widget 210, as illustrated by service 219. Thus, dropping a link on widget 210 can incorporate a functionality associated with the link target. If link 252 is a link to an object, the data may be displayed in widget 210. In one embodiment, link 252 is part of an entire results set, which may be dragged and dropped as an entire set onto widget 210.

As an example, an Argo search may result in a list of results, with links to the results. A search in a browser may similarly produce a list of results of services available. In one embodiment, the dragging and dropping creates a metadata layer, which could be generated in relationship metadata 260, and an object descriptor that identifies what happens. For example, when a user performs a drag operation from Argo, the resulting functionality may depend on knowing what the operation looks like, and what are the methods associated with the operation. Dragging a result into the receiving widget, runtime engine 220 detects the object type and determines how to handle the operation. Based on the determination, functionality may be created, one or more components may be accessed, etc.

In one embodiment, the widgets of operating environment 200 have "collaboration intelligence." That is, for example, widget 210 may have logic to enable it to act as a collaboration mechanism based on certain interactions with items from the desktop. For example, widget 210 may be able to detect that another user desktop has a widget of the same type executing on it. Based on the other widget being online on the other desktop, objects or files dropped onto widget 210 may be immediately sent to the corresponding widget on the other desktop and available to the other user. If the user is online but outside a firewall, widget 210 may email the file to the other user instead of sending it via internal file transfer. Other similar types of interaction and collaboration are also possible.

Figure 3:
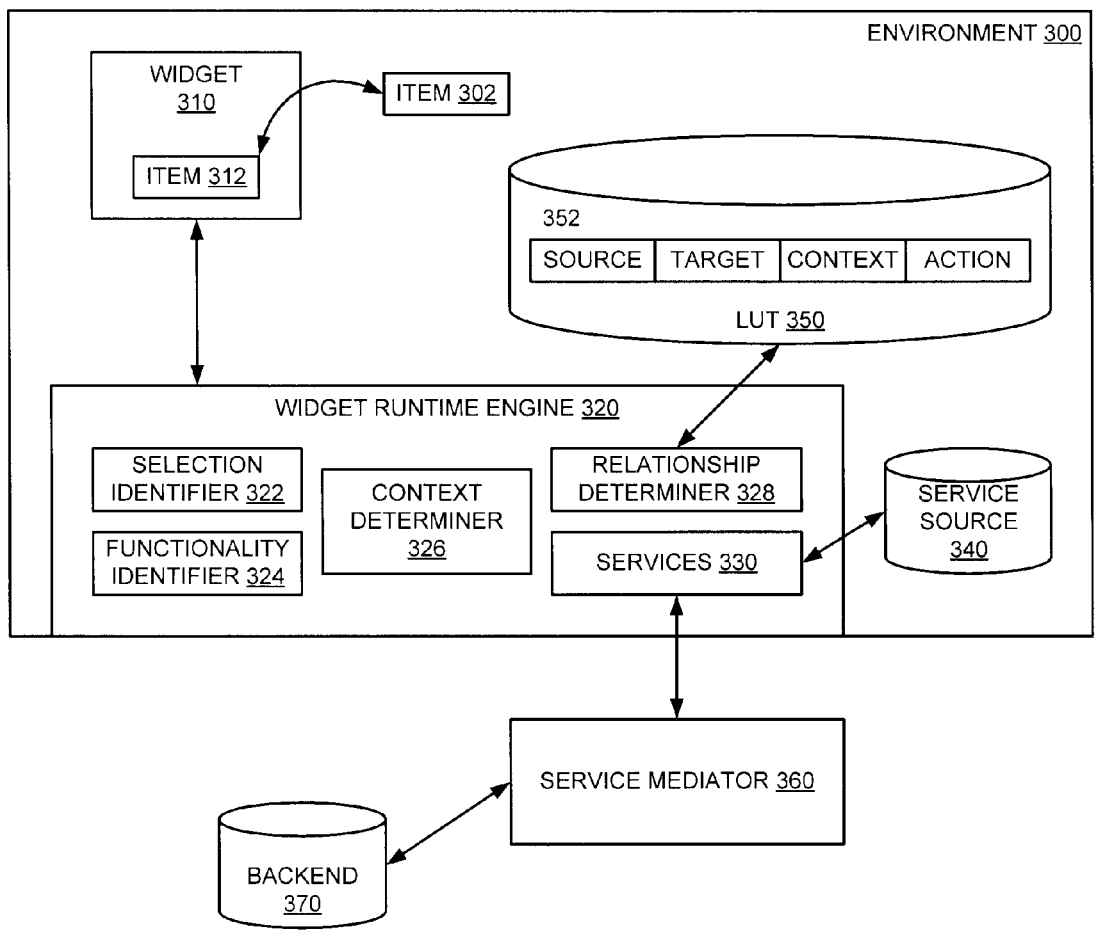
FIG. 3 is a block diagram of an embodiment of an operating environment with a widget runtime engine.

FIG. 3 is a block diagram of an embodiment of an operating environment with a widget runtime engine. Environment 300 represents an example of operating environment 100 of FIG. 1 or 200 of FIG. 2. As represented in environment 300, widget 310 includes item 312 that is associated with a functionality of widget 310. Item 302 of environment 300 has an arrow linking it with item 312, which represents any of the different types of interactions described herein. That is, item 302 and item 312 may be the same item, they may be duplicates of each other, and they represent both interactions of items from widget 310 with environment 300 as well as interactions of items from environment 300 with widget 310.

Environment 300 includes widget runtime engine 320, which provides an example of a runtime engine or a runtime interaction module according to any embodiment described herein. Runtime engine 320 is illustrated with a number of components; however, implementations of runtime engine 320 could be more or less complex than what is illustrated. In one embodiment, runtime engine 320 includes selection identifier 322, functionality identifier 324, context determiner 326, relationship determiner 328, and one or more services 330. Each component is described in more detail below.

Selection identifier 322 enables runtime engine 320 to identify an item and a target that are selected on environment 300. Such capability may be provided by APIs with the operating platform. For example, a GUI may provide an indication of selected items, of copy and paste actions, of drag and drop actions, etc. Selection identifier 322 obtains or receives such information to identify the source and target to determine what interaction can result from the selections.

Functionality identifier 324 enables runtime engine 320 identify a functionality associated with a selected item. The functionality may be provided via the end-user application itself (e.g., widget 310), or with a supporting module (e.g., runtime engine 320), or functionality associated with a backend. In one embodiment, functionality identifier 324 identifies and accesses functionality associated with a link that is dropped into widget 310. The functionality may be associated with an item via a function call or relationship table within the end-user application.

Context determiner 326 enables runtime engine 320 determine a context in which the interaction is taking place. In one embodiment, an end-user application is context-aware, which may include having information to indicate what type of device is executing the application, whether or not the device is online (network connected), whether the device is inside a firewall, whether another corresponding application is executing on another machine, etc. Knowledge of what type of device is executing the application may affect a determination on what action to initiate responsive to the interaction of items and components. That is, different actions may be defined for different contexts. A default action could be applied in most cases, and a specific action be performed if certain conditions exist. For example, a widget could default to emailing a file to another user, unless a corresponding widget is executing on the user's machine, in which case the file may be directly passed to the other application.

Relationship determiner 328 enables runtime engine 320 determine what relationship exists between interacting entities, or what relationship to create for the interacting entities in the case where a relationship does not yet exist and is being created. Particular classes of applications may have particular relationships defined, or relationships may be defined individually for each possible application type. Similarly, relationships may be defined for classes of items or each individual item. In one embodiment, relationship determiner 328 has or has access to relationship metadata, as previously discussed. In one embodiment, relationship metadata is provided by lookup table (LUT) 350, which may include entry 352. Entry 352 can include information such as a source, a target, a context, and an action. Thus, the same source could have multiple different actions, depending on the context and target. As mentioned above, the same source-target pair could have different actions based on context. The source refers to the selected item (whether in an application or in the operating environment) and the target refers to the entity with which the selected item will interact (which could be a drop target in the case of dragging and dropping). Note that LUT 350 is shown with only entry 352, but could include many entries defining multiple scenarios.

Services 330 enables runtime engine 320 to access services available either from within environment 300 (e.g., via service source 340) or from a backend (via service mediator 360). The services can be understood as providing functionality to widget 310. Some services may be available from the operating platform itself, while others may be backend enterprise services. Backend services are accessed through service mediator 360, which is an example of a service mediator as described in co-pending U.S. patent application Ser. No. 11/867,650, filed concurrently herewith. As described therein, in one embodiment, the service mediator can be understood as a mash-up of service plugins. A plugin refers to a software program that operates on top of, or dependently with, another program. Plugins may also be referred to as addons. Plugins utilize APIs or similar mechanisms for control and interfacing, may have a specific associated protocol, and may register with the host program and/or with an operating system on which the host program operates. The plugins may be control modules that are executed on service mediator 360, where service mediator 360 provides user interface and graphical components, and the plugins provide functionality. The plugins enable access to backend 370, and services available from backend 370.

Various components described herein in FIGS. 1, 2, and 3 may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 4:
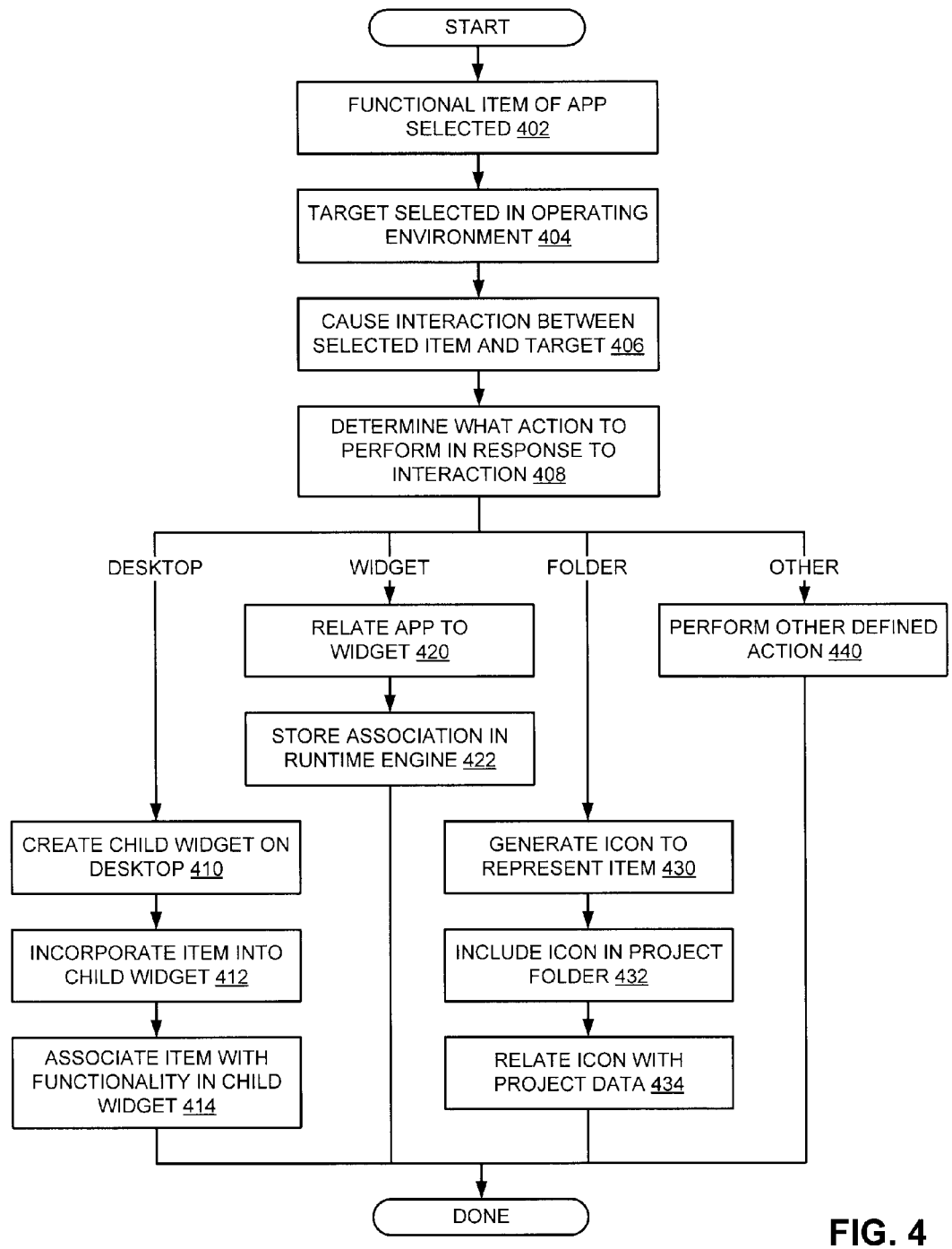
FIG. 4 is a flow diagram of an embodiment of a process for having an item from a widget interact with another element in the operating environment.

FIG. 4 is a flow diagram of an embodiment of a process for having an item from a widget interact with another element in the operating environment. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

A functional item of an end-user application is selected, 402. A target in the operating environment of the application is selected, 404. A user action causes an interaction between the selected item and the target, 406. The user action is identified and a command generated by the system in response to the user action. The user action, as described above, can be a drag and drop, copy and paste, menu selection, etc. The command initiates the interaction, which a runtime interaction module (such as the widget runtime engine of previous figures) determines what action to initiate responsive to the interaction command, 408.

If the selected target is the desktop, the interaction between the item and the desktop can result in the runtime interaction module creating a child widget on the desktop, 410. The item that caused the interaction is incorporated into the child widget, 412, and the item is associated within the child widget with functionality to be provided by the child widget, 414. The child widget is now a standalone entity executing on the environment of the desktop, and capable of being opened and closed, incorporated into aggregations of widgets, etc.

If the selected target is a widget, the interaction can result in a relationship between the end-user application and the widget, 420. The relationship can be, for example, associating the selected item with a collection or a group of widgets. The relationship can be to place the item in a logical container with other objects. The relationship can be to cause the widget to launch each time the end-user application is opened or the selected item on the end-user application is activated. The runtime interaction module can then store the association in a runtime engine, for example, in a metadata layer. Such information will be available to control subsequent operations of the related entities.

If the selected target is a folder or logical container, the interaction can result in the runtime interaction module generating an icon to represent the item, 430, which is included in the project folder or logical container, 432. Whatever functions are associated with the folder can be applied also to the newly added item. The icon is related with project data, 434, thus making the icon and its functionality associated with the project. When the project is viewed, the item will be available with its functionality.

If the selected target is some other target not mentioned, the runtime interaction module performs some other defined action based on the item and the target, 440.

Figure 5:
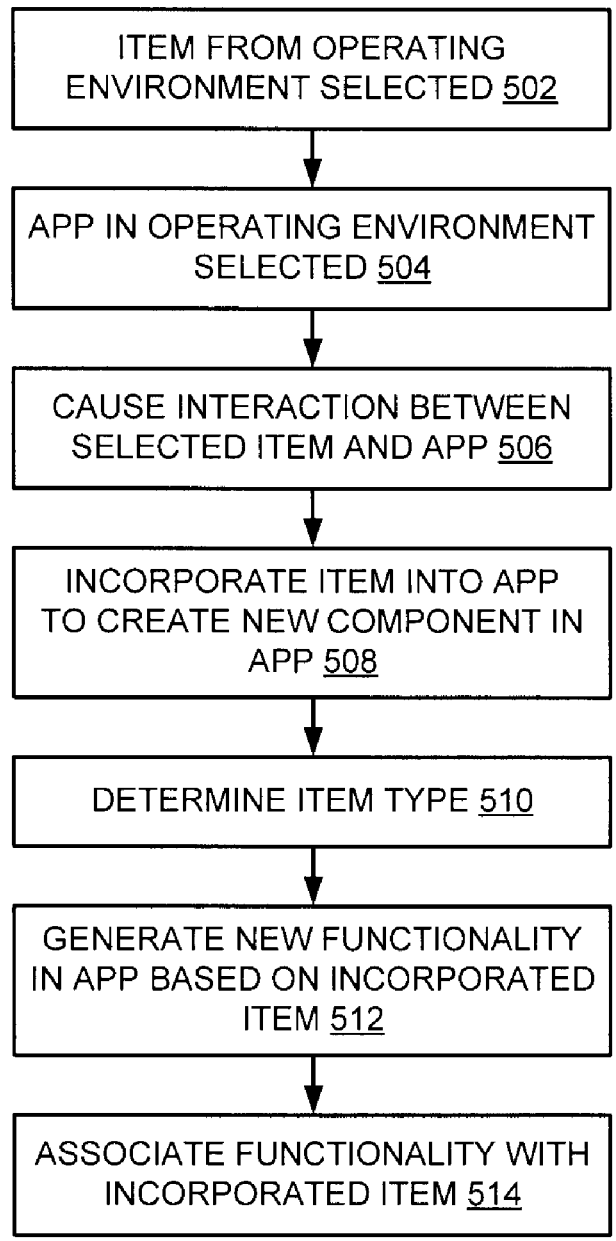
FIG. 5 is a flow diagram of an embodiment of a process for having an item from the operating environment interact with a widget in the operating environment.

FIG. 5 is a flow diagram of an embodiment of a process for having an item from the operating environment interact with a widget in the operating environment. In one embodiment, an item is selected from the operating environment, 502. The item can be selected from the desktop itself, from a widget or application executing on the application, from a folder, from a data repository, from a link, etc. An end-user application in the operating environment is also selected as a target, 504. A user operation causes an interaction between the selected item and the target application, 506. The user operation is converted into commands by the system, which can then be sent to the selected items themselves. In response to receiving the commands indicating the particular interaction caused, a runtime interaction module (such as the widget runtime engine of previous figures) performs various actions.

In one embodiment, the runtime interaction module incorporates the item into the target application to create a new component in the application, 508. The incorporation may include the generation of a text or graphical representation of the component in the application. A graphical representation may be incorporated from the source of the selected item, or a default or generic graphic may be used. In one embodiment, the runtime interaction module determines the type of the item, 510, including identifying a functionality to associate with the item. The item may have an inherent functionality associated with it, or may be assigned a functionality based on its type (e.g., via a relationship lookup as described above).

New functionality is then generated in the end-user application based on the incorporated item, 512. The functionality incorporated into the end-user application is associated with the incorporated item, 514. Thus, selection of the incorporated item will generate the functionality in the end-user application. Note that the functionality and the incorporated item are persisted in the end-user application once incorporated. That is, closing the end-user application and opening it again, or resetting the end-user application will not remove the item or the functionality. They become part of the end-user application itself. A revert operation may be available in some implementations.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method comprising:
   receiving an indication of a selection of an item of an end-user application executing on a desktop, the selected item associated with a functionality provided by coded logic of the end-user application, wherein the selected item represents a modularization of a functional component of a service oriented architecture of an enterprise system, where the selected item provides a service of the enterprise system, and further wherein the functionality of the functional component is provided via a runtime engine that provides an execution platform for functional enterprise service components;
   identifying a target selected on the desktop;
   receiving an interaction command to have the selected item interact with the identified target during runtime of the selected item and the identified target; and
   initiating an action in response to receiving the interaction command, the action based on the functionality associated with the selected item, and a type of the target, where different actions are initiated for different combinations of functionality and type of the target, including storing relationship metadata at the runtime engine to indicate a relationship between the selected item and the target based on the action.

2. The method of claim 1, wherein receiving the indication of selection of the item of the end-user application comprises:
   receiving an indication that a data object of the end-user application is selected, the data object associated with a function that the end-user application provides.

3. The method of claim 1, wherein receiving the indication of selection of the item of the end-user application comprises:
   receiving an indication that a data field of the end-user application is selected, the data field associated with a function that the end-user application provides.

4. The method of claim 1, wherein receiving the indication of the selection of the item of the end-user application comprises:
   receiving the indication of the selection of a self-contained functional component of a widget.

5. The method of claim 1, wherein receiving the interaction command to have the selected item interact with the target comprises:
   receiving an indication of a drag and drop of the selected item onto the target.

6. The method of claim 1, wherein receiving the interaction command to have the selected item interact with the target comprises:
   receiving an indication of a copy and paste of the selected item onto the target.

7. The method of claim 1, wherein receiving the interaction command to have the selected item interact with the target comprises:
   receiving a command to have a selected item from the end-user application interact with the desktop; and
   wherein initiating the action comprises:
   creating a widget that exists independently of the end-user application, the widget having the selected item, which provides functionality in the widget.

8. The method of claim 7, wherein receiving the interaction command to have the selected item from the end-user application interact with the desktop comprises:
   receiving a command to have the selected item from a parent widget interact with the desktop; and wherein initiating the action comprises:
creating a child widget that exists independently of the parent widget, the child widget having the selected item, which provides functionality in the child widget.

9. The method of claim 7, wherein creating the widget that exists independently of the end-user application, the widget having the selected item to provide the functionality in the widget further comprises:
removing the item and the associated functionality from the end-user application.

10. The method of claim 1, wherein receiving the command to have the selected item interact with the target comprises:
receiving a command to have a selected item from the end-user application interact with a widget; and
wherein initiating the action comprises:
creating a relationship between the end-user application and the widget, the relationship based on the functionality of the selected item.

11. The method of claim 1, wherein receiving the interaction command to have the selected item interact with the target comprises:
receiving a command to have a selected item interact with a project folder on the desktop; and
wherein initiating the action comprises:
creating a relationship between the selected item and a project associated with the project folder.

12. An article of manufacture comprising a machine readable storage medium having content stored thereon to provide instructions which when executed cause a computing device to perform operations including:
receiving an indication of a selection of an item of a widget executing on a desktop, the selected item associated with a functionality provided by coded logic of the widget, where the widget is a limited functionality application that executes in conjunction with an underlying runtime engine that provides rendering functionality for the widget on the desktop, wherein the selected item represents a modularization of a functional component of a service oriented architecture of an enterprise system, where the selected item provides a service of the enterprise system, and further wherein the functionality of the functional component is provided via the runtime engine that provides an execution platform for functional enterprise service components;
identifying a target selected on the desktop;
receiving an interaction command to have the selected item interact with the identified target during runtime of the selected item and the identified target; and
initiating an action in response to receiving the interaction command, the action based on the functionality associated with the selected item, and a type of the target, where different actions are initiated for different combinations of functionality and type of the target, including incorporating the functionality into the target for certain combinations of functionality and type of target storing relationship metadata at the runtime engine to indicate a relationship between the selected item and the target based on the action.

13. The article of manufacture of claim 12, wherein the content to provide instructions for receiving the interaction command to have the selected item interact with the target comprises content to provide instructions for
receiving a command to have a selected item from a parent widget interact with the desktop; and
wherein the content to provide instructions for initiating the action comprises content to provide instructions for
creating a child widget that exists independently of the parent widget, the child widget having the selected item, which provides functionality in the child widget.

14. The article of manufacture of claim 12, wherein the content to provide instructions for receiving the interaction command to have the selected item interact with the target comprises content to provide instructions for
receiving a command to have a selected item from a first widget interact with a second widget; and
wherein the content to provide instructions for initiating the action comprises content to provide instructions for
creating a relationship between the first widget and the second widget, the relationship based on the functionality of the selected item.

15. The article of manufacture of claim 12, wherein the content to provide instructions for receiving the interaction command to have the selected item interact with the target comprises content to provide instructions for
receiving a command to have a selected item interact with a project folder on the desktop; and
wherein the content to provide instructions for initiating the action comprises content to provide instructions for
creating a relationship between the selected item and a project associated with the project folder.

16. The article of manufacture of claim 12, wherein the content to provide instructions for initiating the action further comprises content to provide instructions for
looking up an action to perform responsive to the interaction command to have the selected item interact with the identified target, with the selected item and identified target as keys to determine the action to perform.

17. The article of manufacture of claim 16, wherein the content to provide instructions for looking up the action further comprises content to provide instructions for
looking up the action with a work context as a key to determine the action to perform.

18. A computer-implemented method comprising:
receiving an indication of a selection of an item associated with functional logic on a desktop, wherein the selected item represents a modularization of a functional component of a service oriented architecture of an enterprise system, where the selected item provides a service of the enterprise system, and further wherein the functionality of the functional component is provided via the runtime engine that provides an execution platform for functional enterprise service components;
identifying an end-user application selected on the desktop;
receiving a command to have the selected item interact with the end-user application; and
incorporating the selected item into the end-user application to include functionality of the end-user application by generating a functionality in the end-user application according to the enterprise service, the functionality associated with the functional logic of the incorporated item.

19. The method of claim 18, wherein receiving the indication of the selection of the item comprises:
receiving an indication of the selection of one of a functional item of another end-user application, an object, a link to an object or service, or a desktop icon.

20. The method of claim 19, wherein receiving the indication of the selection of the item comprises:
receiving an indication of selection of a link; and further comprising:
accessing a target of the link to obtain functionality to incorporate into the end-user application.

21. The method of claim 18, wherein identifying the end-user application selected on the desktop comprises:
identifying a widget of the desktop.

22. An article of manufacture comprising a machine readable storage medium having content stored thereon to provide instructions which when executed cause a computing device to perform operations including:
receiving an indication of a selection of an item associated with functional logic on a desktop, wherein the selected item represents a modularization of a functional component of a service oriented architecture of an enterprise system, where the selected item provides a service of the enterprise system, and further wherein the functionality of the functional component is provided via the runtime engine that provides an execution platform for functional enterprise service components;
identifying a widget selected on the desktop, where the widget is a limited functionality application that executes in conjunction with an underlying runtime engine that provides rendering functionality for the widget on the desktop;
receiving a command to have the selected item interact with the widget; and
incorporating the selected item into the widget to include functionality of the widget by generating a functionality in the widget according to the enterprise service, the functionality associated with the functional logic of the incorporated item.

23. The article of manufacture of claim 22, wherein the content to provide instructions for receiving the indication of the selection of the item comprises content to provide instructions for
receiving an indication of the selection of one of a functional item of another end-user application, an object, a link to an object or service, or a desktop icon.

24. The article of manufacture of claim 23, wherein the content to provide instructions for receiving the indication of the selection of the item comprises content to provide instructions for
receiving an indication of selection of a link; and
further comprising content to provide instructions for
accessing a target of the link to obtain functionality to incorporate into the widget.

25. A system comprising:
a memory to store code associated with an end-user application;
a processor coupled to the memory to execute the end-user application;
a runtime interaction module coupled to the memory to receive an indication of a selection of an item associated with functional logic of on a desktop executed by the processor, wherein the selected item represents a modularization of a functional component of a service oriented architecture of an enterprise system, where the selected item provides a service of the enterprise system, and further wherein the functionality of the functional component is provided via the runtime engine that provides an execution platform for functional enterprise service components, receive an interaction command to have the selected item interact with the end-user application, and dynamically modify the end-user application by the interaction, wherein modifying the end-user application includes dynamically modifying the functionality of the end-user application based on the interaction by generating in the end-user application functionality associated with the functional logic of the item.

26. The system of claim 25, further comprising:
a lookup table coupled to the runtime interaction module to provide relationship metadata to enable the runtime interaction module to determine how to modify the functionality of the end-user application based on the interaction.

27. The system of claim 25, further comprising:
a service mediator coupled to the memory and the runtime interaction module, the service mediator to access a service from a backend enterprise server, wherein modifying the functionality of the end-user application includes enabling the end-user application to provide the accessed backend service.

28. A computer implemented method comprising:
receiving an indication of a selection of an item associated with functional logic on a desktop, wherein the selected item represents a modularization of a functional component of a service oriented architecture of an enterprise system, where the selected item provides a service of the enterprise system, and further wherein the functionality of the functional component is provided via the runtime engine that provides an execution platform for functional enterprise service components;
receiving an interaction command to have the selected item interact with another component of the desktop; and
dynamically modifying an end-user application by the interaction, wherein modifying the end-user application includes dynamically modifying the functionality of the end-user application based on the interaction by generating in the end-user application functionality associated with the functional logic of the item.

29. The method of claim 28, wherein receiving the indication of the selection of the item comprises:
receiving an indication of the selection of one of a functional item of another end-user application, an object, a link to an object or service, or a desktop icon.

30. The method of claim 28, wherein dynamically modifying the functionality of the end-user application based on the interaction comprises:
modifying existing functionality of the end-user application.

31. The method of claim 28, wherein dynamically modifying the functionality of the end-user application based on the interaction comprises:
adding functionality to the end-user application.

32. The method of claim 28, wherein dynamically modifying the functionality of the end-user application based on the interaction comprises:
removing functionality from the end-user application.

33. The method of claim 28, further comprising:
persisting the modification of the functionality of the end-user application.

* * * * *